US006217336B1

(12) United States Patent
Matthews

(10) Patent No.: US 6,217,336 B1

(45) **Date of Patent: *Apr. 17, 2001**

(54) METHODS AND KITS FOR PAINTING WALLS

(75) Inventor: Susan H. Matthews, Evergreen, CO (US)

(73) Assignee: Camp Kazoo, Ltd., Golden, CO (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/208,074

(22) Filed: Dec. 9, 1998

Related U.S. Application Data

(63) Continuation-in-part of application No. 09/082,719, filed on May 21, 1998.

(51) Int. Cl.[7] ........ G09B 11/10

(52) U.S. Cl. ........ 434/84

(58) Field of Search ........ 434/81, 84, 85, 434/87, 88, 98, 73, 74, 80; 101/112, 114, 128.1

(56) References Cited

U.S. PATENT DOCUMENTS

| | | | | |
|---|---|---|---|---|
| 2,127,047 | * | 8/1938 | Finney | 434/80 |
| 2,491,597 | * | 12/1949 | Adams | 434/80 |
| 3,372,493 | | 3/1968 | Birch | 35/26 |
| 3,581,882 | * | 6/1971 | Bish | 434/81 |
| 3,659,353 | * | 5/1972 | D'Agrosa | 434/73 |
| 3,715,267 | | 2/1973 | Kubo et al. | 161/165 |
| 3,758,695 | | 9/1973 | Goodman et al. | 35/26 |
| 3,802,904 | * | 4/1974 | Morrison | 427/282 |
| 4,017,986 | * | 4/1977 | Miller | 434/73 |
| 4,311,464 | * | 1/1982 | Messina | 434/74 |
| 4,328,051 | * | 5/1982 | Robinette | 156/62 |
| 4,550,683 | | 11/1985 | Jones | 118/505 |
| 4,564,406 | * | 1/1986 | Binks | 156/63 |
| 4,584,042 | * | 4/1986 | Wandriok | 156/280 |
| 4,626,218 | * | 12/1986 | Wright | 434/73 |
| 4,652,239 | * | 3/1987 | Brimberg | 434/80 |
| 4,696,400 | * | 9/1987 | Warman | 206/575 |
| 4,902,229 | * | 2/1990 | Pedersen | 434/80 |
| 5,141,437 | * | 8/1992 | Fowlkes | 434/72 |
| 5,184,910 | * | 2/1993 | Betsill | 402/8 |
| 5,196,237 | * | 3/1993 | May | 427/288 |
| 5,209,663 | * | 5/1993 | Wilcox | 434/84 |
| 5,226,990 | | 7/1993 | Satomi | 156/62 |
| 5,292,255 | * | 3/1994 | Goldwasser | 434/84 |
| 5,344,322 | * | 9/1994 | Wilcox | 434/84 |
| 5,372,506 | | 12/1994 | Hambright | 434/84 |
| 5,382,233 | * | 1/1995 | Brotz | 434/88 |
| 5,460,087 | | 10/1995 | Ogorzalek | 101/128.21 |
| 5,505,620 | * | 4/1996 | Barlett | 434/73 |
| 5,562,451 | * | 10/1996 | Wilcox | 434/84 |
| 5,622,109 | | 4/1997 | Ikejima et al. | 101/128.21 |
| 5,788,501 | * | 8/1998 | Hassall | 434/84 |
| 6,045,639 | * | 4/2000 | Davis | 156/62 |

* cited by examiner

*Primary Examiner*—Jacob K. Ackun
*Assistant Examiner*—K. Fernstrom
(74) *Attorney, Agent, or Firm*—Townsend and Townsend and Crew LLP

(57) ABSTRACT

The invention provides exemplary painting kits and methods for their use. In one exemplary method, a surface is painted by first physically transferring a pattern from a sheet to a surface to be painted. The pattern defines regions that are to be painted with paint. The surface having the pattern is then painted, with each region being painted with a pre-defined color of paint.

17 Claims, 10 Drawing Sheets

FIG. 2B
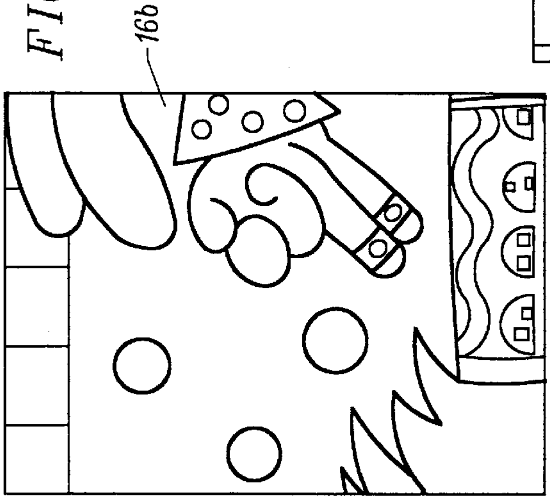
FIG. 2D
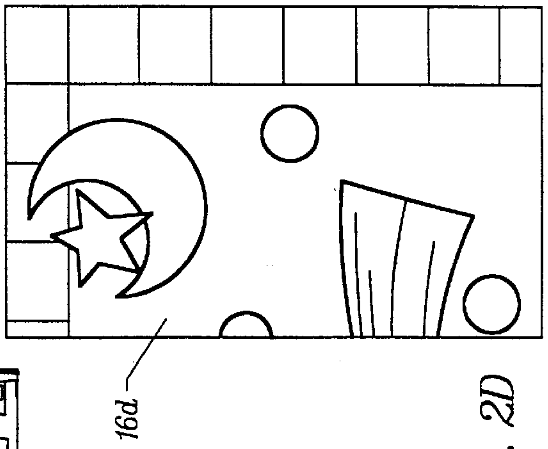
FIG. 2A
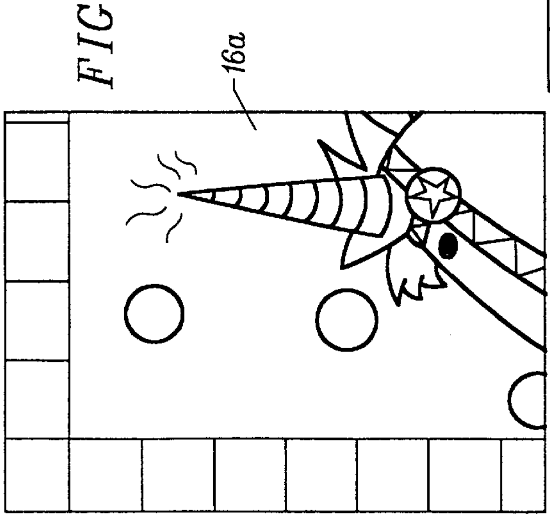
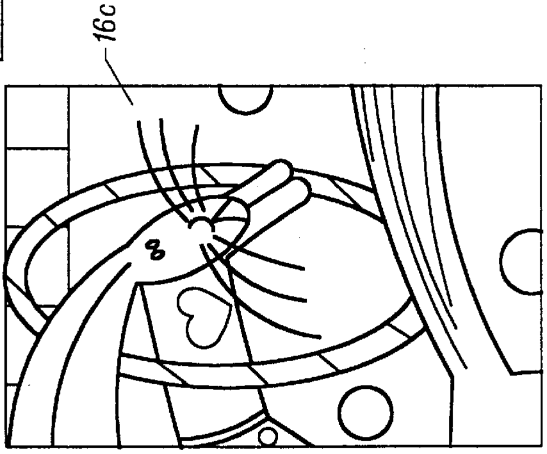
FIG. 2C

METHODS AND KITS FOR PAINTING WALLS

CROSS REFERENCE TO RELATED APPLICATIONS

This application is a continuation in part application of U.S. patent application Ser. No. 09/082,719, filed May 21, 1998, the complete disclosure of which is herein incorporated by reference.

BACKGROUND OF THE INVENTION

This invention relates generally to the field of painting, and in particular to the use of patterns to guide a painter in the painting process.

When decorating a room, a variety of materials are available to assist the decorator. For example, one common way to decorate a room is with the use of wall paper. Although useful in many applications, some prefer not to use wall paper because of the difficulty in applying the wall paper, and more importantly, because of the difficulty in removing the wall paper when redecorating.

One alternative to wall paper is the use of paint, particularly because of the ease in redecorating by simply repainting. However, use of paint when decorating can be especially challenging if it is desired to paint a scene or a pattern. For example, one popular way to decorate a wall is to paint a colorful scene on the wall, such as a landscape scene. However, when attempting to paint such a scene on a wall, the decorator must first design the appropriate scene, and then paint the scene with appropriate sizes, proportions and colors.

To accomplish such a task, a professional artist may be commissioned for the project. However, this can be expensive and considerable time and effort may be expended in locating the appropriate artist. One alternative to this approach has been proposed in U.S. Pat. No. 4,696,400, the disclosure of which is herein incorporated by reference, and relies on the use of a pattern which is projected onto a wall using a projector. The decorator then paints the wall according to the projected pattern. Such a process is undesirable in that it requires the use of an expensive projector and can require the room to be darkened in order to see the pattern, thereby making it difficult to see when painting. Moreover, if the decorator steps in front of the projector, the image projected by the projector will be blocked. Further, if the projector is moved, the projected image will also move. Use of such a projector is also undersireable in that the size of the projected pattern is dependent on the distance of the projector from the wall. If the room is not large enough, the appropriately sized pattern cannot be produced. Also, the projector may tend to distort the pattern as it is projected onto the wall.

Hence, it would be desirable to provide a more convenient and effective way to allow a desired area to be decorated with the use of paint. In particular, it would be desirable to provide a way to paint various scenes or murals onto a surface with minimal or no painting experience and with minimal preparation time and tools. It would be further desirable if the invention provided a kit to assist in painting a wide variety of scenes or murals onto a painting surface.

SUMMARY OF THE INVENTION

The invention provides exemplary painting kits and methods for their use. In one exemplary embodiment, a painting kit is provided which comprises at least one sheet having a pattern which is adapted to be physically transferred to a painting surface, preferably by applying energy to the sheet. The pattern defines regions which are to be painted with different colors. The kit further includes a set of instructions indicating a preferred paint color for each region. In this way, a pattern for a mural or a scene may conveniently be physically transferred to a painting surface which is then painted with the colored paints.

Preferably, the sheet has a front side and a back side, and the pattern is included on the front side. Further, the pattern is transferable to the painting surface by application of heat to the back side. For example, the pattern may be transferred simply by placing the sheet against a wall and moving a heated iron across the pattern until the pattern is transferred to the wall. Alternatively, the pattern may be transferred to the painting surface by applying pressure to the back side or by simply placing the sheet against the painting surface. For instance, the sheet may be placed against the wall and the sheet rubbed to transfer the pattern.

Preferably, the pattern will be included on a plurality of sheets to make transfer of the pattern to the painting surface more manageable. A wide variety of patterns may be incorporated into the kit. For example, the patterns may define landscapes, characters, jungles, fantasy scenes, and the like. Optionally, one or more complimentary sheets may be included in the kit. The complimentary sheets include patterns which compliment the main mural or scene and which may also be physically transferred to a painting surface. For example, the complimentary pattern may comprise a border, a window treatment, and the like.

The set of instructions provided in the kit are preferably placed in booklet form and have a reduced size model of the pattern. Further, each region of the model is colored with the preferred color so that a user may visualize one preferred color arrangement. A color guide may further be provided so that the customer will be able to obtain paints which match the colors in the model. As one alternative, each of the regions may include a symbol, such as a number, which is representative of a preferred paint color, and the set of instructions may include a legend which correlates the symbols with the preferred paint colors. In this way, the user simply paints each region with the color paint that corresponds to the numbered region.

The invention further provides an exemplary method for painting a surface. According to the method, a pattern is physically transferred from a sheet to a surface to be painted, preferably by applying energy to the sheet. The pattern defines regions that are to be painted with paint. The surface is then painted with paint, with each region being painted with a pre-defined color of paint.

The pattern is preferably transferred to the surface by placing the sheet against the surface and applying heat to the sheet until the pattern is transferred. For instance, heat may be applied to the sheet by moving a heated iron over the sheet as the sheet is adjacent to the surface. For convenience, the pattern may be included on a plurality of sheets, with each sheet including a portion of the pattern. In this way, each sheet is individually placed against the surface so that the portion of the pattern on each sheet may be transferred onto the surface.

In one exemplary aspect, a set of instructions are provided indicating the arrangement of the sheets. For convenience, the pattern may be included on a plurality of sheets, with each sheet including a portion of the pattern. In this way, each sheet is individually placed against the surface so that the portion of the pattern may be transferred onto the surface.

In one exemplary aspect, a set of instructions are provided indicating the arrangement of the sheets to produce the mural or scene. In another aspect, instructions are provided giving one or more preferred colors of paint for each region. For example, the instructions may be provided in a booklet having a reduced size model of the pattern, with each region of the model being colored with a preferred color. Conveniently, a color guide may be provided having samples of each of the preferred colors. In this way, the user may take the color guide to a paint store to obtain the appropriate colors of paint. As one alternative, each region of the pattern may include a number that is transferred to the surface. With such a configuration, the instructions preferably include a legend which correlates the numbers with their associated colors.

BRIEF DESCRIPTION OF THE DRAWINGS

FIGS. 2A–2H illustrate various sheets of the kit of FIG. 1, which when combined, form a mural according to the invention.

DETAILED DESCRIPTION OF THE SPECIFIC EMBODIMENTS

Figure 1:
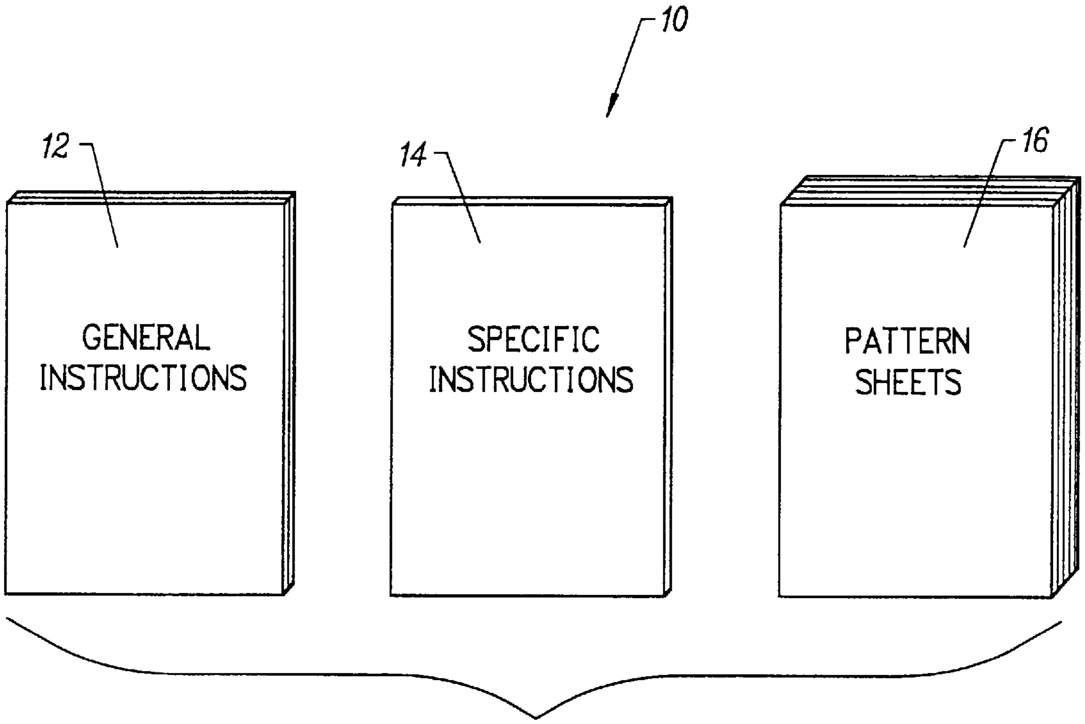
FIG. 1 illustrates various items included within an exemplary painting kit according to the invention.
Figure 2E:
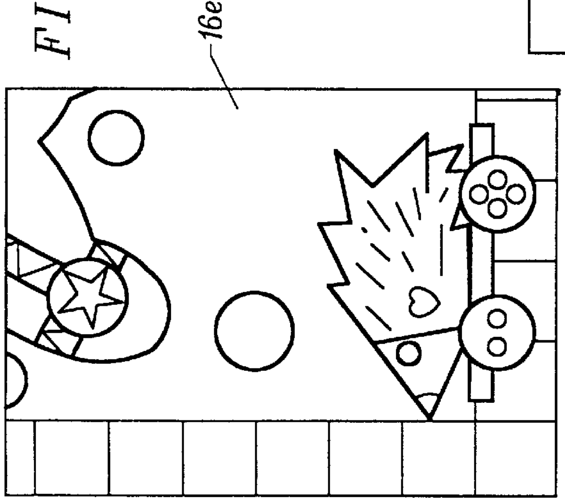
Figure 2F:
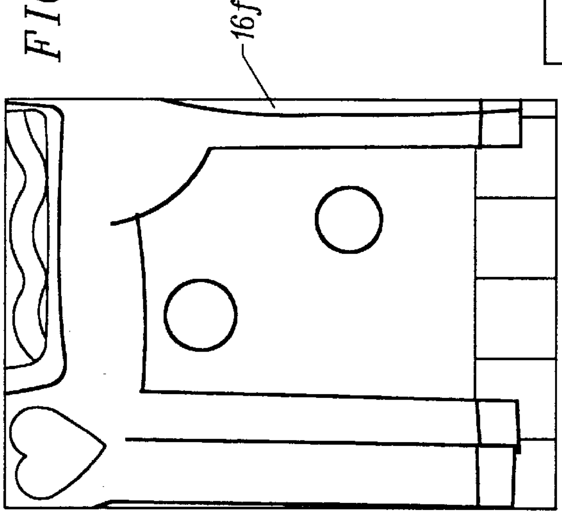
Figure 2G:
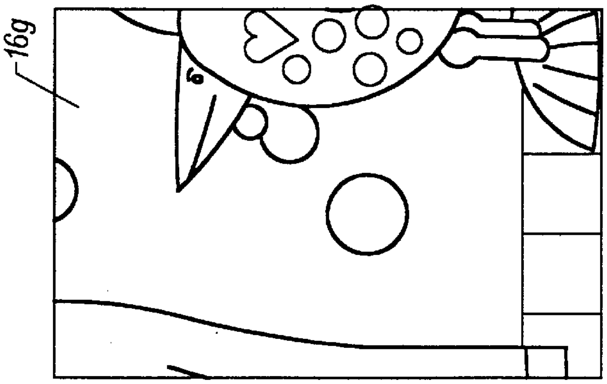
Figure 2H:
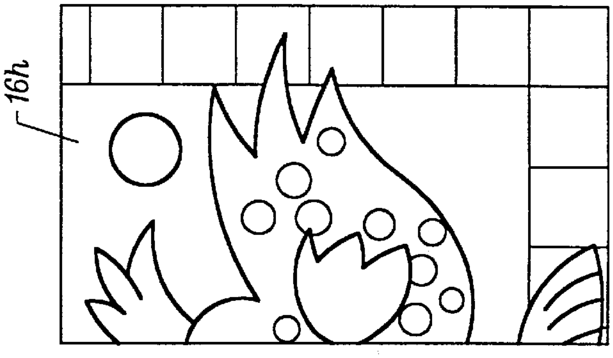

The invention provides a convenient way to create a mural or scene on a surface. According to the invention, a pattern is physically transferred onto the surface to provide an outline of regions which are to be colored. The physical transfer of a pattern onto a surface is advantageous in that the pattern will not move around when attempting to paint the surface. As such, once the pattern is transferred to the wall, a painter at her leisure may paint a mural or scene without the risk of the pattern being repositioned relative to the painting surface.

A preferred way to physically transfer the pattern is by forming the pattern on a sheet of material, placing the sheet against the surface and then applying energy to the sheet to transfer the pattern onto the surface. One preferable type of energy is heat. Hence, the sheets in one embodiment preferably comprise a lightweight, foldable material that can withstand the application of temperatures supplied by commercially available household irons. In this way, the sheets may be conveniently folded to be placed in kit form. Exemplary sheets which may be used with the invention include sheets commonly employed in making fabric patterns, such as those commercially available from Simplicity.

The pattern is preferably constructed of ink which liquefies when subjected to heat. In this way, when heat is applied to a back surface of the sheet, the ink on the front surface melts and transfers to the painting surface. One exemplary way to supply heat to the sheet is by the use of a heated iron, such as a commercially available household iron. Preferably, the ink will liquefy when the iron is set on a wool setting.

A variety of other ways to heat transfer the pattern onto the painting surface are described generally in U.S. Pat. Nos. 3,922,435; 4,027,345; 4,038,123; 4,066,810; 4,224,358; 4,294,641; 4,496,618; 5,100,718; and 5,419,944, the complete disclosures of which are herein incorporated by reference. The transferred pattern preferably defines an outline of the area or areas to be painted. However, it will be appreciated that more than just an outline of the areas to be painted may be transferred. For example, the material transferred may also partially fill or completely fill the outlined areas of the pattern. Further, the outline, and any filled regions, may be of any color and/or texture. Still further, although an ink material is the preferred material of transfer, it will be appreciated that a variety of other materials may be transferred, including those described in the above referenced patents, waxes, dyes, polymers, including decals, and the like.

Although the preferred method of transfer is by application of heat, it will be appreciated that other methods may also be employed to physically transfer the pattern from the sheet onto the painting surface. For example, the pattern may be rubbed from the sheet onto the wall. Such a technique is commonly referred to as a dry transfer technique and is described generally in U.S. Pat. Nos. 4,028,165; 4,111,734; 4,228,211; 4,286,008; 4,374,691; 4,421,816; and 5,814,402, the complete disclosures of which are herein incorporated by reference. Materials which may be rubbed onto the painting surface include inks, crayons, waxes, dyes, graphite, polymers, including decals, and the like, and may be of any color or texture. Further, the transferred pattern may outline, partially fill, or completely fill various areas as previously described.

In one alternative embodiment, the sheet may have a shape which outlines the areas to be painted. In this way, a marker or other writing instrument may be moved around the periphery of the sheet to produce the outline on the painting surface. In some cases, the sheet may include slits or scores to allow the marker the produce internal lines within the outer border or to produce any reference symbols.

The sheet is preferably removably affixed to the painting surface during the process of transferring the pattern from the sheet onto the painting surface. For instance, commercially available painters tape may be employed to tape the sheet to the painting surface until the transfer is compete. Other methods of removably affixing the sheet to the painting surface include pins, tacks, tacky clay, tape, and the like.

The pattern may be included on one or more sheets. For larger patterns, the pattern is preferably included on multiple smaller sized sheets so that the process of transfer is more manageable. With such a configuration, the pattern on each sheet is separately transferred. Each successive sheet is preferably aligned with the previously transferred pattern so that the completed pattern is properly aligned.

Once the pattern is transferred to the painting surface, the regions defined by the pattern are preferably colored. A variety of coloring mediums may be used to color the regions. A preferred coloring medium is paint, although other mediums may also be used, including pastels, chalks, markers, crayons, and the like.

A variety of schemes may be used to indicate which regions of the pattern are to receive specific colors. One convenient way is by providing reduced size models of the pattern which are pre-colored so that the user can simply copy the colors from the model. Alternatively, each region of the pattern may include a reference symbol, such as a number, which may be corresponded to an associated color. Conveniently, this symbol may be transferred to the painting surface along with the pattern. In this way, the user simply needs to correlate the number on the region with a paint color. Alternatively, the reduced size models may have reference symbols associated with each region, and a look-up table may be provided to associate the correct color for each region.

The user may be provided with a variety of options for obtaining the desired paint colors. For example, a color guide may be provided with recommended colors for coloring the pattern. The colors in the paint guide will preferably correspond to the colors in the pre-colored model. In this way, the user can simply take the color guide to a paint store where the paint store can match or create the appropriately colored paints. Conveniently, instructions may also be provided as to the amount of paints that will be required to paint the pattern. As another alternative, instructions may be given as to suggested manufacturers and their associated paint colors. As still another alternative, a painting kit may be provided with actual paints so that the user will not be required to go to a paint store to separately purchase the paints.

Referring now to FIG. 1, an exemplary embodiment of a painting kit 10 will be described. Kit 10 includes a booklet of general instructions 12, a booklet of specific instructions 14, and a set of pattern sheets 16. The booklet of general instructions 12 includes information of a general nature related to painting. For example, booklet 12 may include a discussion on various types and qualities of paints, various techniques for applying paints to various surfaces, suggested surface preparation techniques, suggested types of brushes, markers, and the like. In this way, a user may become generally familiar with a painting process prior to attempting to paint a mural or a scene on a surface.

Merely by way of example, for painting a mural on a wall with the above specified paint, the general instructions may include a recommendation for brushes used with acrylic or water color paints. Brushes with slanted tips are preferably used to provide better control and sharper lines. A typical recommendation includes the following sizes: 1½," 1," ¾," ½," ⅜." To paint any outlines, a stiff ⅛" brush is recommended. Still further, the general book of instructions may include a recommended list of supplies such as drop cloths, an extension cord, an iron, a ladder, masking tape, a pencil, a plum line, push pins, and a tape measurer.

As previously described, for walls it is preferred to have the wall painted with a flat latex paint. The base coat is preferably a white or off white paint because it allows the colors painted over it to appear most brilliant. In some cases, the base coat may be the same color as the background color of the mural. It is preferred that the base coat dry at least 24 hours, and more preferably 48 hours before applying the transfer.

The booklet of specific instructions 14 has instructions specific to the pattern included on sheets 16. For example, booklet 14 may include instructions on how to transfer the pattern from sheets 16 onto a surface to be painted. Booklet 14 may further include reduced size models of the pattern which are pre-colored with suggested color schemes or have symbols representative of colors as described hereinafter with reference to FIGS. 7 and 9. In this way, a user may choose from one or more proposed color schemes. Other information that may be provided in booklet 14 includes color guides, the amount of paint required to paint a mural, information on various complementary patterns, and the like.

Merely by way of example, the specific book of instructions may include the following information. For painting a wall that is approximately 12' long by 8' high, a base coat of paint is preferably employed. Typically, the instructions specify the purchase of one gallon of paint for covering a light surface, an additional gallon of primer if covering a dark surface. Preferably, the paint comprises a white flat latex paint. To paint the mural, the instructions may specify one gallon of paint of background color and one quart of paint for dominant colors. Further, two ounces of colored paint are required for small splashes of color on the mural. The paint may be either acrylic or latex paint. To paint the various complementary patterns, such as height charts, windows, corners, lights, and the like, one quart of acrylic or latex paint may be required for dominant colors while two ounces of paint may be used for each minor color.

The specific instructions may also include information on proper placement of the pattern or complementary pattern. For example, the instructions may provide information reciting that if there is a part of the pattern that is not desired to be transferred, masking tape may be placed over the unwanted portion on the ink side of the pattern sheet. The tape is placed such that the non-sticky part of the tape faces the wall once the pattern is placed on the wall. The instructions may also include information reciting that once the pattern is placed on the wall, any words printed on the sheet will be able to be read. If the pattern sheet is placed incorrectly, the words will be backwards.

The specific instructions preferably recite the use of a "wool" setting for the iron, while using no water so that no steam is produced. The iron is placed onto the pattern for 10 to 15 seconds. The iron is not to be moved back and forth but rather to be lifted and moved to the next part of the sheet that has ink to be transferred. This process is repeated for every line on the pattern sheet. The instructions further include information to make sure that there is no water in the iron since moisture may ruin the pattern and damage the wall. The instructions also recite that once the pattern is cool to the touch it may then be removed from the wall. The pattern is lifted slowly from one corner making sure that the image has transferred. If the pattern is transferred correctly, the line will appear a light to medium gray. If the pattern has not transferred, the pattern sheet may be re-ironed for 10 to 15 seconds.

The specific book of instructions may also include tips, such as suggestions not to tape the pieces together because they may become cumbersome and wrinkled. Also, tips are provided to indicate that ironing should begin from the middle rather than the sides. Also, a plum line may be used to make sure that the first pattern piece is straight. Subsequent pattern pieces may then be lined up with the first transfer.

As described hereinafter, some of the designs may be cut out from the sheet. The instructions recite that room should be left around the design to allow room for taping. The tape should never touch the transfer line.

To paint the wall once the pattern has been transferred, the instructions suggest that the user start with light colors and then paint dark colors. Paint is to be allowed to dry thoroughly before painting it with another color, otherwise the colors may run together. If any mistakes are made, these may be painted over with a white primer/sealer. After this is dried, the process may be repeated.

For furniture, the instructions recite that the above process may be employed while using a base coat of latex paint before transferring the pattern. For fabrics, a special fabric paint may be employed after the transfer has been ironed directly onto the fabric (which does not need any preparation).

Although not shown, booklets 12 and 14 and sheets 16 are preferably marketed in a convenient package which may also include a general overview of instructions for use. It will be appreciated that booklets 12 and 14 may be incorporated into a single set of instructions. Further, some of the material in the booklets may be included directly on the packaging which holds sheets 16. For example, the packaging may comprise a relatively small box, such as an 8" by 5" by 3" box, which holds the folded pattern sheets. Reduced sized models of the pattern may be shown on the box with preferred paint colors. One side of the box may also include colored sections which correspond to the colors in the models. These sections may be numbered or lettered to so that they may correspond to numbers or letters placed on a reduced size model to indicate preferred paint colors. Also, the sections may include an indication of the amount of paint to purchase for each color. The exterior of the box may also have a condensed set of instructions for use.

Figure 3:
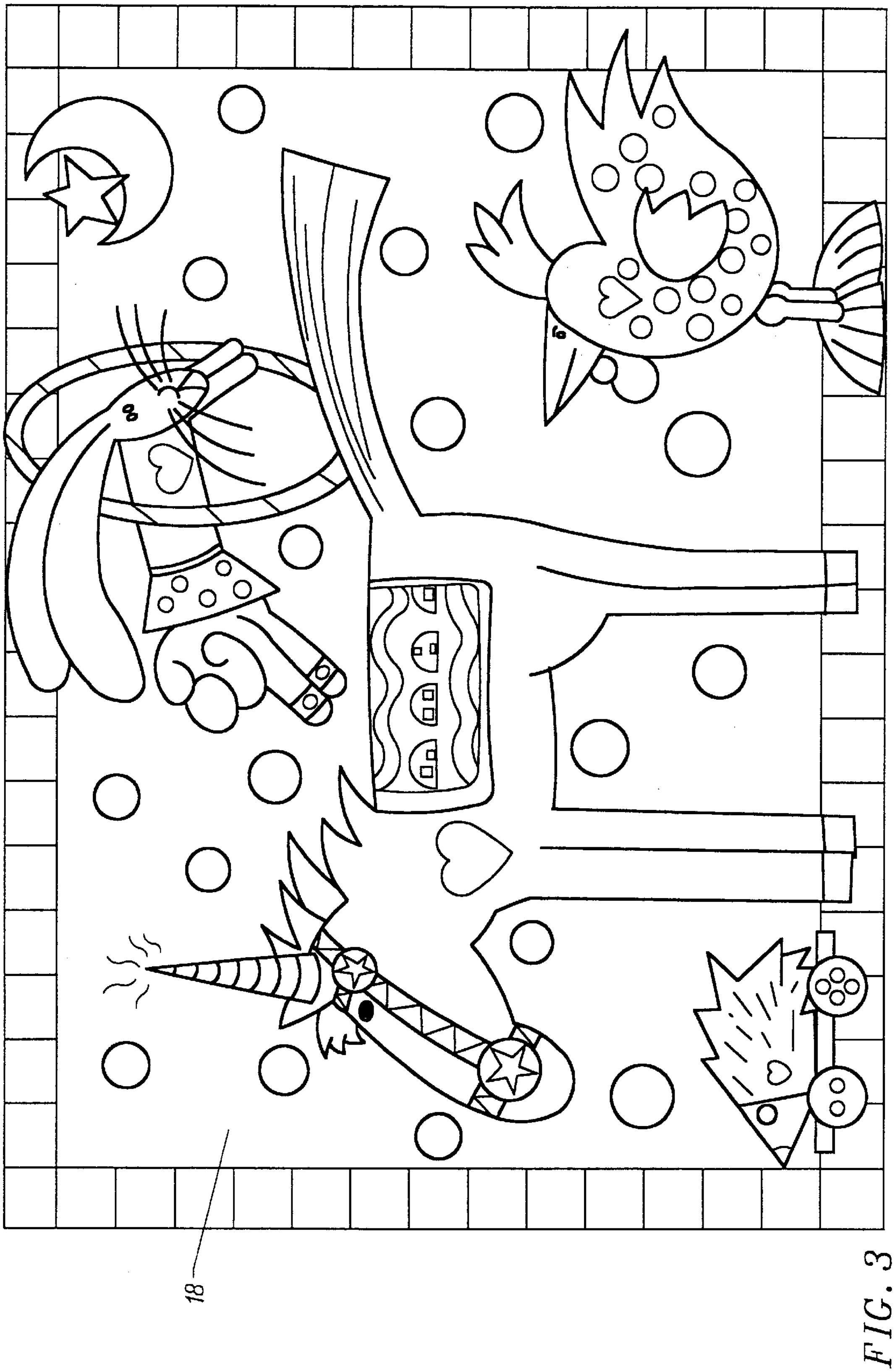
FIG. 3 illustrates the pattern that is formed when the sheets of FIGS. 2A–2H are combined according to the invention.

A wide variety of patterns may be included on sheets 16 to allow for the creation of a wide variety of murals or scenes on a surface, such as a wall, furniture, fabrics, and the like. For example, the patterns may define a landscape, animals, people, characters, fantasy scenes, letters or numbers (in various fonts), and the like. Merely by way of example, FIGS. 2A–2H illustrate an exemplary set of sheets, referred to by use of reference numerals 16*a*–16*h*. When sheets 16*a*–16*h* are placed next to each other and heat is applied to a back surface, a pattern 18 is transferred to the surface as illustrated in FIG. 3. The pattern of FIG. 3 may be configured to be any size. As such, it will be appreciated that the size and number of individual sheets 16*a*–16*h* may be varied so that the particular size of each individual sheet is manageable upon transfer of the pattern to the surface. Merely by way of example, each of sheets 16*a*–16*h* may have a size of about 45"×45", 45"×59", 50"×45", or 45"×30". However, it will be appreciated that other sizes may also be used. As another example, in some cases it may be desirable to put the entire pattern on only a single sheet.

Sheets 16*a*–16*h* are constructed of a material which is foldable so that sheets 16*a*–16*h* may be folded to be placed in kit 10. As previously described, such a kit may include a box to hold the folded sheets. Conveniently, the box may have tab with a hole at its top end to facilitate display of the box by inserting the box over a peg that extends from a shelf as is common with many retail stores. When ready for use, sheets 16*a*–16*h* are simply unfolded and removably attached to a surface that is to receive the pattern. Heat is then applied to a back side of sheets 16*a*–16*h* to transfer pattern 18 onto the surface. Pattern 18 is then ready to be painted as described hereinafter.

Figure 4:
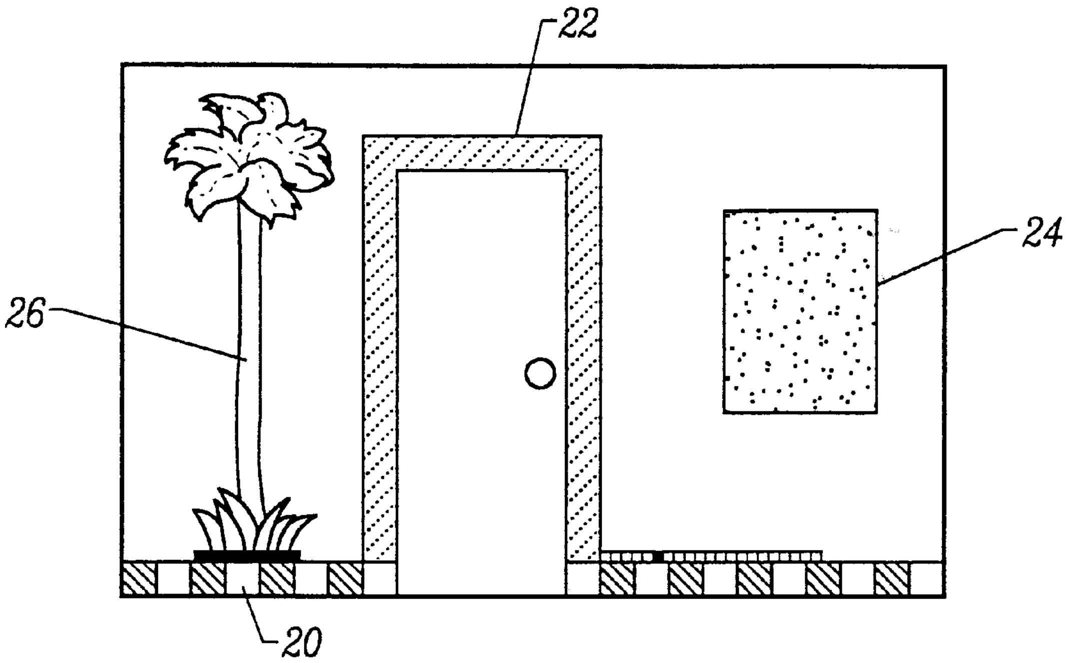
FIG. 4 illustrates one example of various complementary patterns that may be included in the kit of FIG. 1 according to the invention.
Figure 4A:
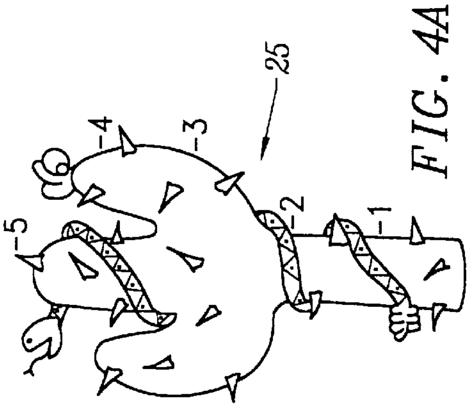
FIGS. 4A and 4B illustrate other complementary patterns according to the invention.
Figure 4B:
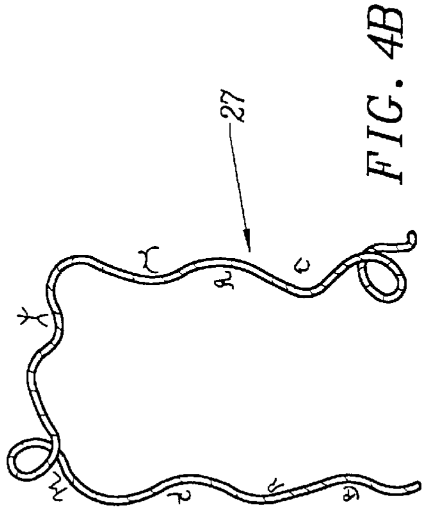

In addition to sheets 16*a*–16*h*, kit 10 may include various complementary sheets which have patterns which compliment pattern 18. For example, as shown in FIG. 4, the complementary sheets may include patterns for creating a border 20, a door outline 22, a window treatment pattern 24, and a height scale 26, which allows a child to measure his or her height. The various complementary patterns may be included on sheets similar to sheets to 16*a*–16*h* and may have their patterns transferred to a surface by application of heat in a similar manner. In this way, a room may be complimented by various other patterns in addition to the mural or scene produced by pattern 18. Other complementary patterns are shown in FIGS. 4A and 4B. FIG. 4A shows a height chart 25 in the form of a cactus. FIG. 4B shows a window or door outline 27 in the form of a rope.

Figure 5:
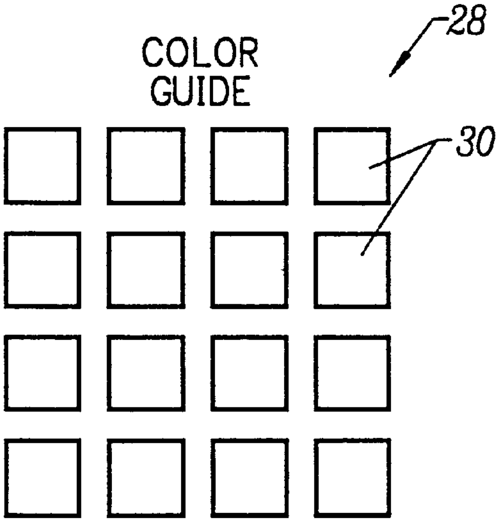
FIG. 5 illustrates an example of a color guide that may be included in the specific instruction booklet of FIG. 1 according to the invention.

Booklet 14 preferably includes a color guide 28, as shown in FIG. 5. As previously described, color guide 28 may also be included on a box which holds the sheets. Color guide 28 preferably includes a plurality of color samples 30, which correspond to the colors in a suggested color scheme set forth in booklet 14. For example, booklet 14 may include a reduced size model of pattern 18, which is pre-colored, and color samples 30 correspond to the colors in the reduced size model. In this way, the user may simply take the color guide 28 to a paint store so that the appropriate paints may be purchased to color pattern 18. Of course, it will be appreciated that a user may decide on her own color scheme and not employ the use of color guide 28. Preferably, booklet 14 also includes suggested volumes of paints which correspond to the colors in color guide 28. Conveniently, each sample 30 may include a symbol to indicate the required amount of paint. For example, the following symbols may be employed: G=gallon, Q=quart, and 2=2 ounces. The samples 30 may also include paint color reference symbols that may be correlated with reference symbols on a reduced sized model as described hereinafter with reference to FIG. 9.

Figure 6A:
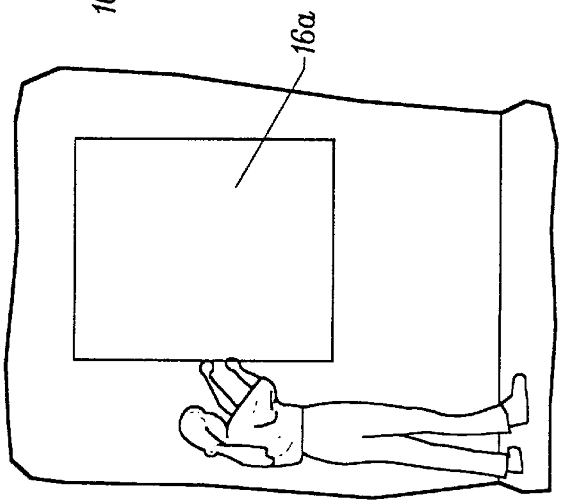
FIGS. 6A–6C illustrate various steps of the method of FIG. 6.
Figure 6B:
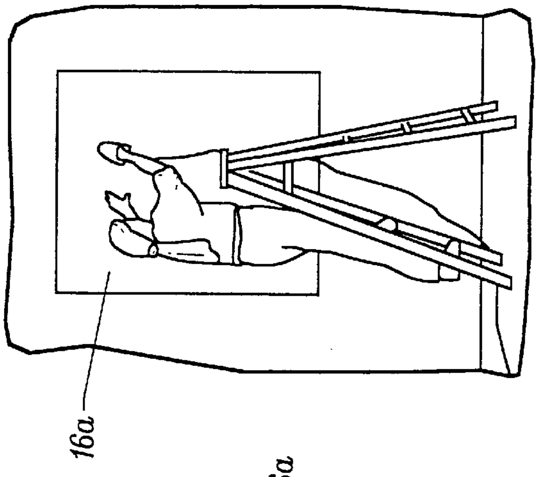
Figure 6C:
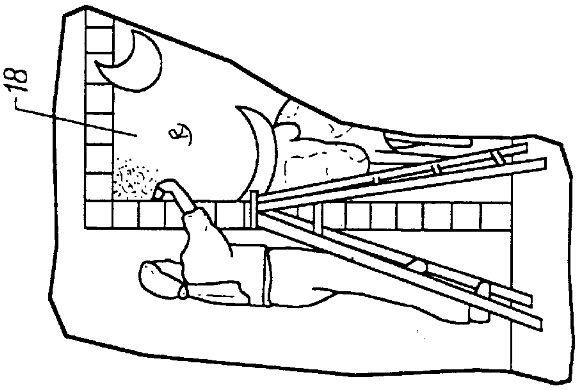
Figure 6:
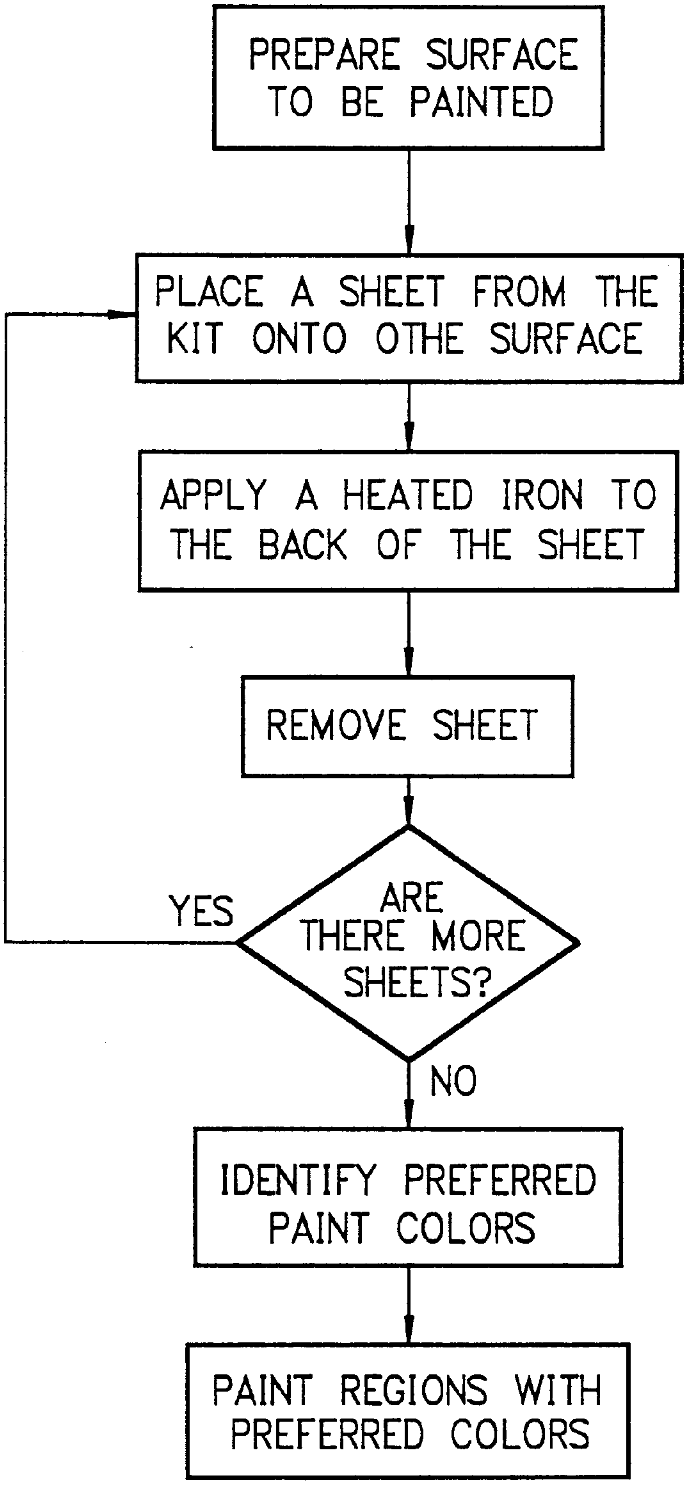
FIG. 6 illustrates an exemplary method for transferring a pattern to a painting surface and then painting the painting surface to produce a mural or a scene according to the invention.

Referring now to FIG. 6, an exemplary method for producing a mural or scene on a surface using kit 10 will be described. Initially, the user prepares a specific surface to be painted. Conveniently, the user may refer to the booklet of general instructions 12 for information on surface preparation as well as other general information related to painting as previously described. Once the selected surface is properly prepared, one of sheets 16*a*–16*h*, such as, for example, sheet 16*a*, is removably attached to the surface. For instance, sheet 16*a* may be taped to the surface with painters tape as shown in FIG. 6A. Preferably, booklet 14 includes a map showing the proper arrangement of sheets 16*a*–16*h* so that the user will be notified to place sheet 16*a* in the upper left-hand corner of the future mural or scene.

Sheet 16*a* is affixed to the wall such that a front surface having the ink is adjacent to the wall. A heated iron is then moved over the back side of sheet 16*a* to heat the ink and transfer it to the wall as shown in FIG. 6B. After the ink has been transferred, sheet 16*a* is removed. Another one of the sheets, such as sheet 16*b*, is then aligned with the transferred pattern from sheet 16*a* and removably affixed to the wall. The heating process is then repeated to transfer the pattern from sheet 16*b*. The process is then repeated for sheets 16*c*–16*h* until pattern 18 is produced on the wall.

Once the pattern is transferred to the wall, the user identifies the colors to paint each region of the pattern. As previously described, this may be accomplished by locating a suggested pre-colored pattern within booklet 14 or by creating the user's own color scheme. If desired, the user may take the color guide to a paint store to have the appropriate paints produced. The user then paints each region within pattern 18 (see FIG. 6C) with the desired paint color until the mural or scene is completed. If needed, the user may at any time refer to the booklet of general instructions 12 to obtain hints for applying the paint or to receive other helpful information.

Once pattern 18 is colored, various complimentary patterns may be transferred to other areas within the room using the complimentary sheets from kit 10 as previously described. The complimentary patterns are then painted in a manner similar to that described in connection with pattern 18.

Once the pattern and any complementary patterns have been colored, an outline may be provided between each of the colors to finish off the mural. Providing an outline is advantageous in that it may hide small gaps that may appear between the colors. Preferably, outlining is accomplished by using a small artist angle brush and paint or by using permanent markers. If paint is to be used, a stiff ⅛" brush is preferably employed as previously described. However, other brushes may be used depending on the desired thickness of the outline. For markers, a user simply selects the desired width of marker which corresponds to the desired width of the line. Multiple markers may need to be required since they may tend to clog when marking over paint and can wear away when marking over textured walls.

Some designs may have interior lines that may wish to be darkened after the design is painted. For example, as illustrated in an alternative model 40 of FIG. 7, an armadillo 42 includes multiple interior lines. To assist in visualizing these lines after the paint has been applied, a marker may be employed to darken the lines prior to painting. Once painting is completed, the marker is re-applied to finish off the lines.

Figure 7A:
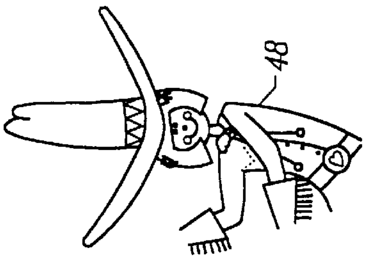
FIG. 7A illustrates a replacement figure for the pattern of FIG. 7.
Figure 7:
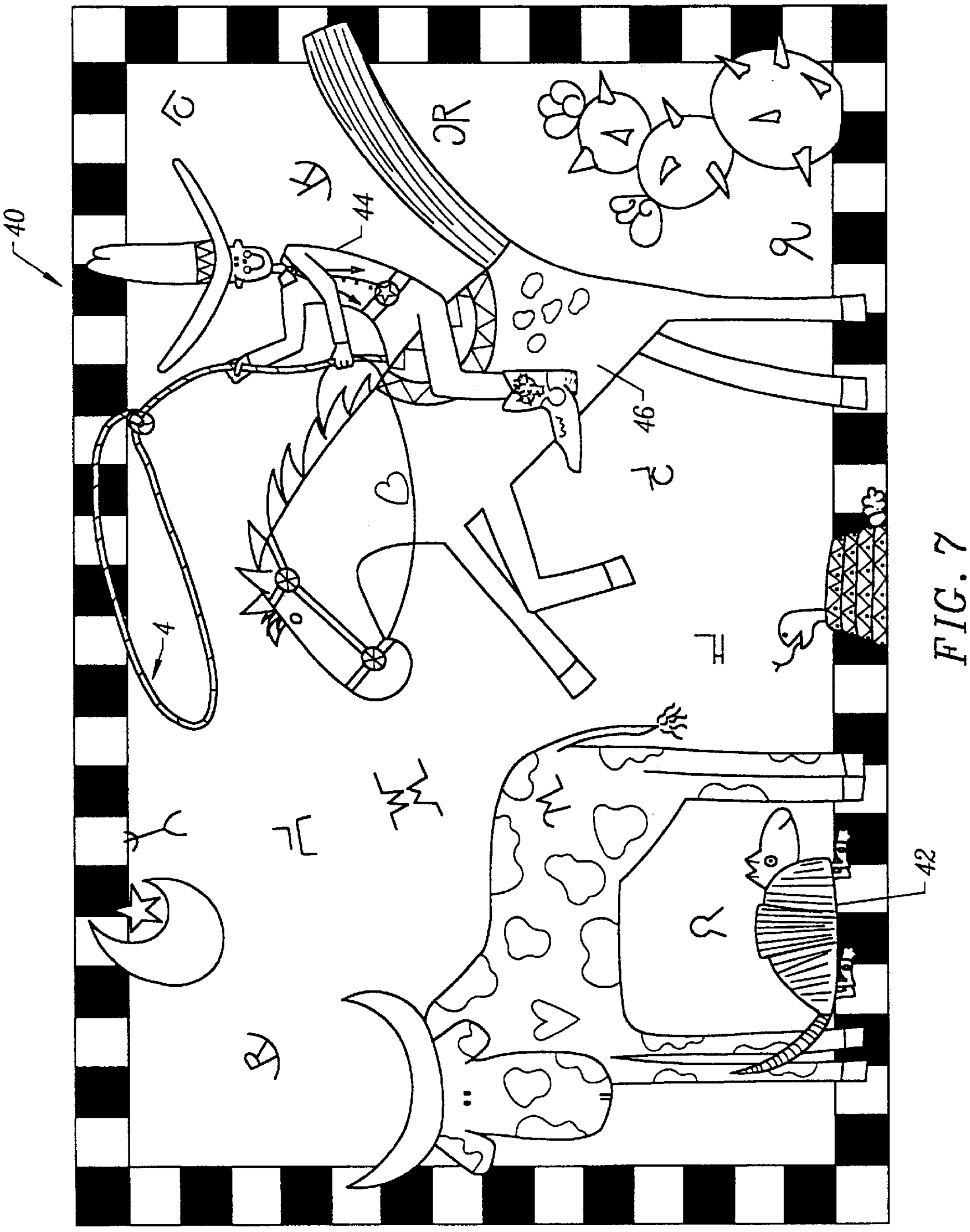
FIG. 7 illustrates a model of an alternative pattern according to the invention.

As just described, FIG. 7 illustrates an alternative model 40. Model 40 preferably corresponds to multiple sheets which have a pattern which may be transferred to a painting surface similar to the other patterns described herein. FIG. 7 includes a male FIG. 44 which is riding a horse 46. As shown in FIG. 7A, the painting kit may include a female FIG. 48. To replace male FIG. 44 with female FIG. 48, the sheet having male FIG. 44 is layed out and male FIG. 44 is cut out from the sheet. Female FIG. 48 is then placed in the same position as male FIG. 44. Female FIG. 48 is configured such that the remaining hands of the male figure will be aligned with the arms of the female figure, and the waist of the female FIG. 48 will be sitting on the remainder of the body which is on horse 46. In this way, any of the figures in any of the patterns may easily be replaced by simply providing alternative figures with similar dimensions.

Figure 8:
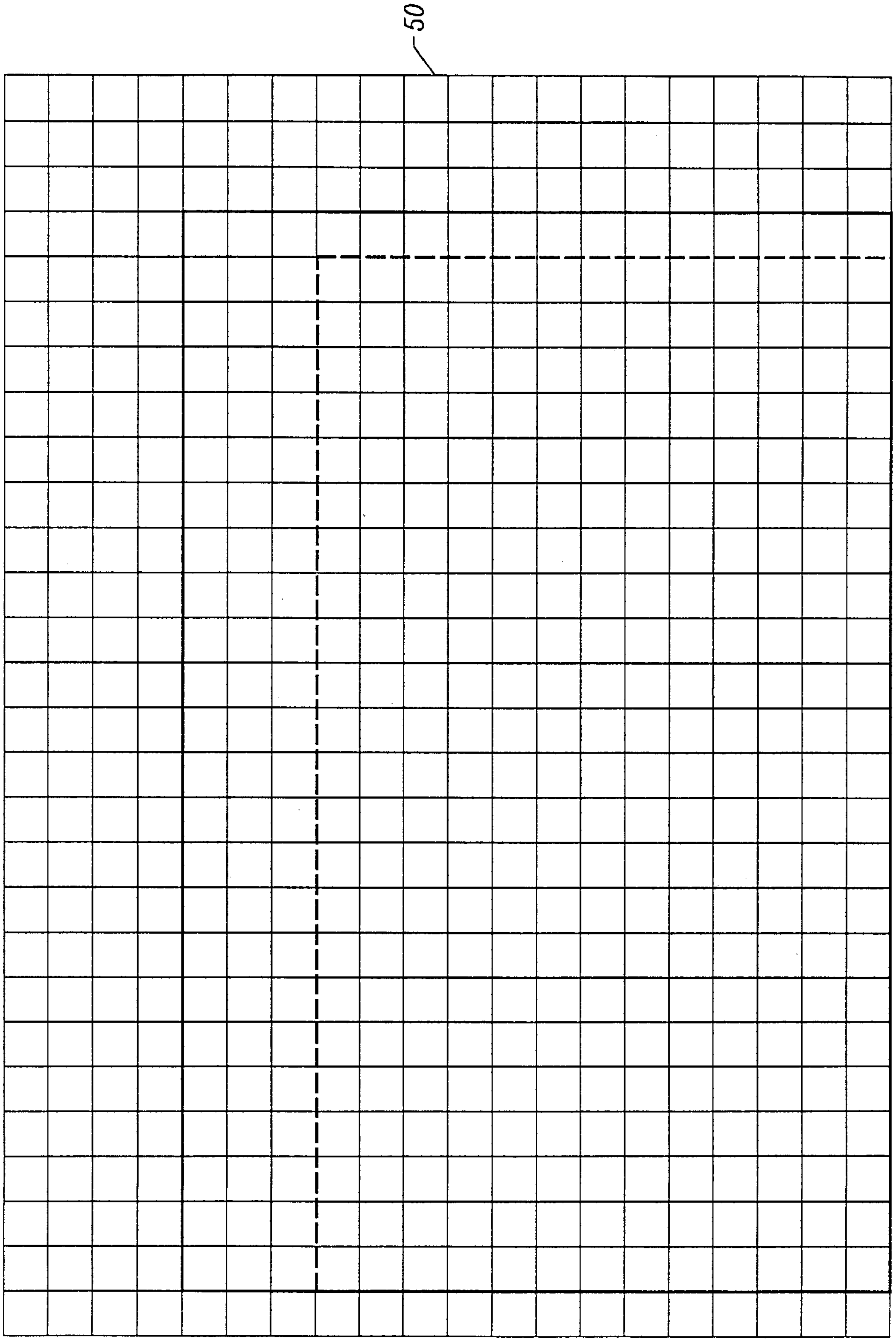
FIG. 8 illustrates a grid to assist in adjusting the size of a pattern according to the invention.

The invention also provides a way to modify the size of the pattern so that it may be used with a variety of different sized painting surfaces. This is best accomplished by providing a grid 50 as shown in FIG. 8. Each square of grid 50 represents a 6"×6" section of the mural. Grid 50 is sized such that one of the reduced sized models, such as model 40 of FIG. 7, may be placed onto the grid. Merely by way of example, model 40 may correspond to a pattern that is approximately 8' by 12'. When model 40 is placed onto grid 50, its outline is indicated by the bold line. The user then marks, such as with a dash line, the size of the desired painting surface. The user then uses scissors to cut out the various figures of model 40 and compresses the design so that it will fit within the dashed line. A similar procedure is used if the dashed line is outside of the solid line, with the figures being spaced apart from each other so that the model will fit within the larger area. In this manner, the user if provided with an estimate of how the actual pattern should be cut and placed on the wall. In cases where the wall is larger than the pattern, the user may need to use a marker to fill in gaps between the lines, such as to fill in gaps existing between the border.

Figure 9:
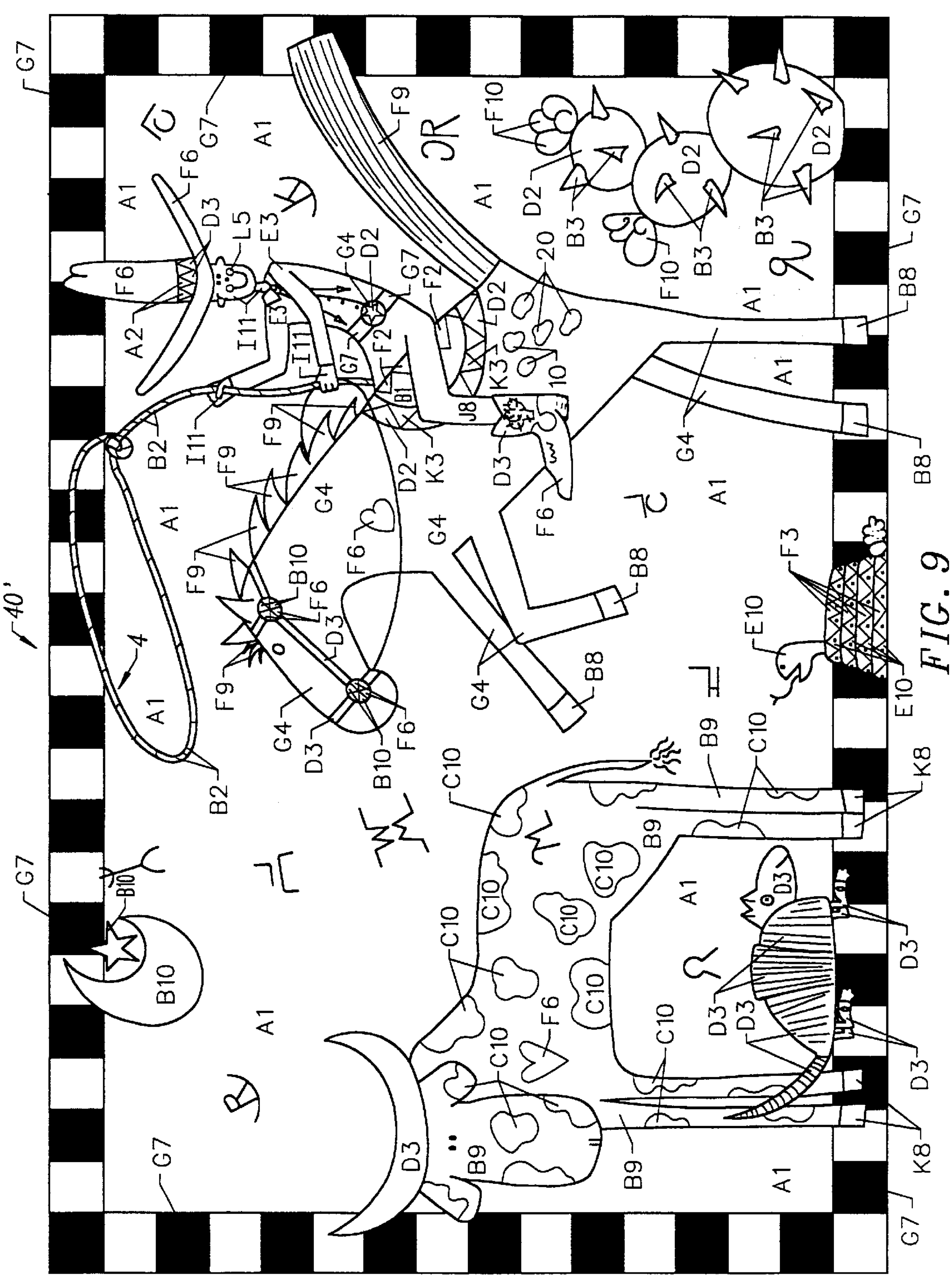
FIG. 9 illustrates the model of FIG. 7 with two types of identification symbols that are representative of two color schemes according to the invention.

Referring now to FIG. 9, an alternative model 40' is shown. Model 40' is essentially identical to model 40 of FIG. 7 except that it includes a number and a letter that is associated with each region in the pattern. Each number represents a color in which that region is to be painted. Similarly, each letter represents a color that each region is to be painted. In this way, model 40' shows two different paint schemes that may be employed to paint a mural on a painting surface. Conveniently, samples 30 of the color guide of FIG. 5 may each be marked with a letter or number which corresponds to the letters or numbers of model 40'. In this way, after a user has transferred the pattern onto the wall, the user references model 40' and the color guide to determine the appropriate color for each region. Since each region is marked with a different letter and number, it will be appreciated that two different color guides will need to be employed. Conveniently, the pattern of instructions or the box containing the pattern sheets may include a colored model showing the two different color schemes that will be obtained if the suggested color schemes are followed.

Extra reduced sized models may also be provided in the kits of the invention to allow the user to experiment with the various types of paints on the model. Once a preferred paint scheme is determined, the user may refer to the painted model when painting the mural on the surface.

The invention has now been described in detail for purposes of clarity of understanding. However, it will be appreciated that certain changes and modifications may be made. For example, it will be appreciated that the various regions within pattern 18 may be marked with a symbol, such as a number, which is representative of a paint color. In this way, booklet 14 may include a legend which correlates the number with a specific paint color so that pattern 18 may be painted in a paint-by-number manner. Therefore, the scope and content of the invention are not limited by the foregoing description. Rather, the scope and content are to be defined by the following claims.

What is claimed is:

1. A painting kit comprising:

at least one main sheet having a pattern which is adapted to be physically transferred from the main sheet and to a painting surface by applying energy to the main sheet, wherein the pattern defines regions which are to be painted with different colors, and wherein the pattern defines and outlines at least one figure;

a figure sheet having a pattern of a replacement figure for the figure of the main sheet; and a set of instructions indicating a preferred paint color for each region and reciting a method for cutting out the figure from the main sheet and inserting the replacement figure of the figure sheet.

2. A painting kit as in claim 1, wherein the main sheet has a front side and a back side, wherein the pattern is included on the front side, and wherein the pattern is transferable to the painting surface by application of heat to the back side.

3. A painting kit as in claim 1, wherein the main sheet has a front side and a back side, wherein the pattern is included on the front side, and wherein the pattern is transferable to the painting surface by application of pressure to the back side.

4. A painting kit as in claim 1, wherein the instructions include a reduced size model of the pattern, with each region of the model being colored with the preferred color, and wherein the instructions include a color guide illustrating each preferred color.

5. A painting kit as in claim 1, wherein the main sheet is formed from a plurality of sheets, wherein portions of the pattern are included on each of the sheets.

6. A kit as in claim 1, wherein the regions each include a symbol which is representative of a preferred paint color, and wherein the set of instructions includes a legend which correlates the symbols with the preferred paint colors.

7. A painting kit as in claim 6, wherein the symbols comprise numbers.

8. A painting kit as in claim 1, further comprising a packaging material to house the instructions and the sheet.

9. A painting kit as in claim 1, further comprising at least one complementary sheet having a complementary pattern which is adapted to be physically transferred to a painting surface.

10. A method for painting a surface, the method comprising:

providing a painting kit comprising a plurality of sheets that have a transferable pattern and outer edges, a reduced size model of the pattern, and a sheet having a grid;

marking the grid with an estimate of a final size of a scene to be painted onto a surface, wherein the estimated final size is larger or smaller than that defined by the pattern when the outer edges of the sheets are placed adjacent each other;

cutting the reduced size model into pieces and arranging the pieces on the grid in accordance with the estimated final size;

arranging the sheets onto the surface based on the arrangement of the pieces on the grid;

physically transferring the pattern from the sheets and onto the surface to be painted by applying energy to the sheet, the pattern defining regions that are to be painted with paint, wherein the transferred pattern has a size that is larger or smaller than that defined by the pattern when the outer edges of the sheets are placed adjacent each other; and painting the surface having the pattern with paint, with each region being painted with a certain color of paint.

11. A method as in claim 10, wherein the transferring step further comprises placing the sheets against the surface and applying heat to the sheet until the pattern is transferred to the surface.

12. A method as in claim 11, wherein the heat is applied to the sheets by moving a heated iron over the sheets.

13. A method as in claim 10, wherein the transferring step further comprises placing the sheets against the surface and applying pressure to the sheets until the pattern is transferred to the surface.

14. A method as in claim 10, further comprising providing instructions giving a preferred color of paint for each region.

15. A method as in claim 14, wherein the instructions comprise the reduced size model of the pattern, with each region of the model being colored with a preferred color.

16. A method as in claim 15, wherein the instructions further include a color guide having samples of each of the preferred colors.

17. A method as in claim 10, wherein each region of the pattern includes a number that is transferred to the surface, and wherein the instructions comprise a legend which correlates the numbers with their associated colors.

* * * * *